US008712373B2

(12) United States Patent
Ward (10) Patent No.: US 8,712,373 B2
(45) Date of Patent: Apr. 29, 2014

(54) SECURE SERVICE FOR ENABLING COMMUNICATION FOR CALLING PARTY WHEN COMMUNICATION SERVICE FOR CALLED PARTY IS SUSPENDED (75) Inventor: Jonathan O. Ward, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1170 days.

(21) Appl. No.: 11/746,905

(22) Filed: May 10, 2007

(65) Prior Publication Data
US 2008/0280590 A1    Nov. 13, 2008

(51) Int. Cl.
H04M 11/00    (2006.01)
(52) U.S. Cl.
USPC ........... 455/406; 455/407; 455/408; 455/410; 455/414.1
(58) Field of Classification Search
USPC .......... 455/406–408, 410, 414.1; 379/114.21, 379/114.23, 114.28
See application file for complete search history.

(56) References Cited

U.S. PATENT DOCUMENTS

| 5,673,312 | A * | 9/1997 | Andruska et al. ........ 379/207.13 |
| 7,269,251 | B1 * | 9/2007 | Jokinen .......................... 455/406 |
| 2002/0077100 | A1 * | 6/2002 | Hasegawa et al. ........... 455/433 |
| 2002/0147002 | A1 * | 10/2002 | Trop et al. ...................... 455/406 |
| 2003/0143978 | A1 * | 7/2003 | Cooper et al. ................. 455/406 |
| 2005/0101291 | A1 * | 5/2005 | Scalisi et al. .................. 455/406 |

FOREIGN PATENT DOCUMENTS

WO    WO 2007045881 A1 *    4/2007

* cited by examiner

Primary Examiner — Vladimir Magloire
Assistant Examiner — Jing Gao
(74) Attorney, Agent, or Firm — Parks IP Law LLC; Li K. Wang, Esq.

(57) ABSTRACT

Selective calling party pays via a secure service feature may be provided. A determination is conducted to decide if a called party's wireless communications service has entered a suspension state. Next, if the wireless communication service is in a suspension state, a determination is conducted to decide if a secure service feature has been purchased for the particular wireless communications service under suspension. Next, if the wireless communications service includes the secure service feature, a determination is conducted to decide if a caller calling the called party is permitted to communicate with the called party when the called party's communications service is under suspension. If a caller is determined to be an authorized caller, a communications path is provided for the caller and the called party. Billing associated with the communications is charged to the caller instead of the called party.

23 Claims, 2 Drawing Sheets

SECURE SERVICE FOR ENABLING COMMUNICATION FOR CALLING PARTY WHEN COMMUNICATION SERVICE FOR CALLED PARTY IS SUSPENDED

BACKGROUND

Selective calling party pays via a secure service feature is a process for providing communications to a recipient when a user's communication service is under suspension. Often individuals attempt to establish communications, for example, a cellular telephone call, with another, but the individuals cannot complete the cellular telephone because the recipient's cellular telephone service is temporarily disconnected (suspension) or permanently disconnected. For example, a parent may desire to call a child away at college by calling their cellular telephone; however, the parent cannot complete the telephone call because child's cellular service is disconnected for failure of payment. Even though cellular service for the child is disconnected, the parent may still desire to contact the child and must resort to an alternative method of communications, which could create a significant delay because the parent cannot communicate with the child using the cellular that is often in close proximity to the child.

SUMMARY

Selective calling party pays via a secure service feature may be provided. In accordance with one embodiment, a method is provided for securing wireless communications service when a service plan associated with the wireless communications service is under suspension. The method determines a current state of wireless communications service for an associated wireless telephone number. If the current state of wireless communications service is a suspension state, the method determines it the service plan associated with the wireless telephone number includes a secure service feature. In addition to determining if the service plan associated with the wireless telephone number includes a secure service feature, the method provides a communications path for communicating with a wireless communications device associated with the wireless telephone number to receive an incoming communications when the service plan includes the secure service feature, and billing the communications to a communications device not associated with the wireless communications device.

In accordance with another embodiment, a computer-readable medium is provided which stores a set of instructions which when executed performs a method for securing wireless communications service when a service plan associated with the wireless communications service is under suspension. The computer-readable medium also determines a current state of wireless communications service for an associated wireless telephone number. If the current state of wireless communications service is a suspension state, the computer-readable medium determines if the service plan associated with the wireless telephone number includes a secure service feature. In addition to determining if the service plan associated with the wireless telephone number includes a secure service feature, the computer-readable medium provides a communications path for communicating with a wireless communications device associated with the wireless telephone number to receive an incoming communications when the service plan includes the secure service feature, and billing the communications to a communications device not associated with the wireless communications device.

In accordance with another embodiment, a system is provided for securing wireless communications service when a service plan associated with the wireless communications service is under suspension. The system includes a component for determining a current state of wireless communications service for an associated wireless telephone number. If the current state of wireless communications service is a suspension state, the system uses a component for determining if the service plan associated with the wireless telephone number includes a secure service feature. In addition to determining if the service plan associated with the wireless telephone number includes a secure service feature, the system includes a component for providing a communications path for communicating with a wireless communications device associated with the wireless telephone number to receive an incoming communications when the service plan includes the secure service feature, and a component for billing the communications to a communications device not associated with the wireless communications device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Selective calling party pays via a secure service feature may be provided. Consistent with embodiments of the present invention, a method, system, and computer readable medium securing cellular service when a service plan associated with the cellular service is under suspension is disclosed. Often family members may need to contact another family member using one or more forms of wireless communications, for example, voice or text communications. There may be occasions in which a family member, for example, a parent, cannot communicate with another family member, for example, a child away at college, because the child could not afford to pay their cellular telephone bill, or simply forgot to pay their cellular telephone bill. However, the parent may still desire to communication with their child even though the child's cellular telephone service has been temporarily disconnected for non-payment, i.e., suspension.

Accordingly, the parent may be willing to be charged, for example, a $2.00 fee, for communicating with the child even though the child's cellular telephone service is under suspension (secure service). The parent may use the secure service feature for a temporary period of time, for example, two months, during a suspension period. Therefore, a secure service feature may be utilized to facilitate communications between a designated number of callers and a called party whose cellular telephone service is under suspension. The designated callers may be stored in a list, and the list of designated callers may include callers that use a variety of communication's providers.

An embodiment consistent with the invention includes a computer readable medium for securing wireless communications service when a service plan associated with the wireless communications service is under suspension. The computer readable medium stores a set of instructions which when executed performs a method for securing wireless communications service when a service plan associated with the wireless communications service is under suspension. The performed method determines if a called party's wireless communications service has entered a suspension state, for example, wireless communications service is suspended by a wireless communications service provider for non-payment. If the wireless communication service is in a suspension state, the method determines if a secure service feature has been purchased for the particular wireless communications service under suspension. If the wireless communications service includes the secure service feature, the method then determines if a caller calling the called party is permitted to communicate with the called party when the called party's communications service is under suspension. For example, authorized callers may be stored and associated with the called party's secure service feature. Accordingly, if a caller is determined to be an authorized caller, the method provides a communications path between the caller and the called party. However, billing associated with the communications is charged to the caller instead of the called party.

Figure 1:
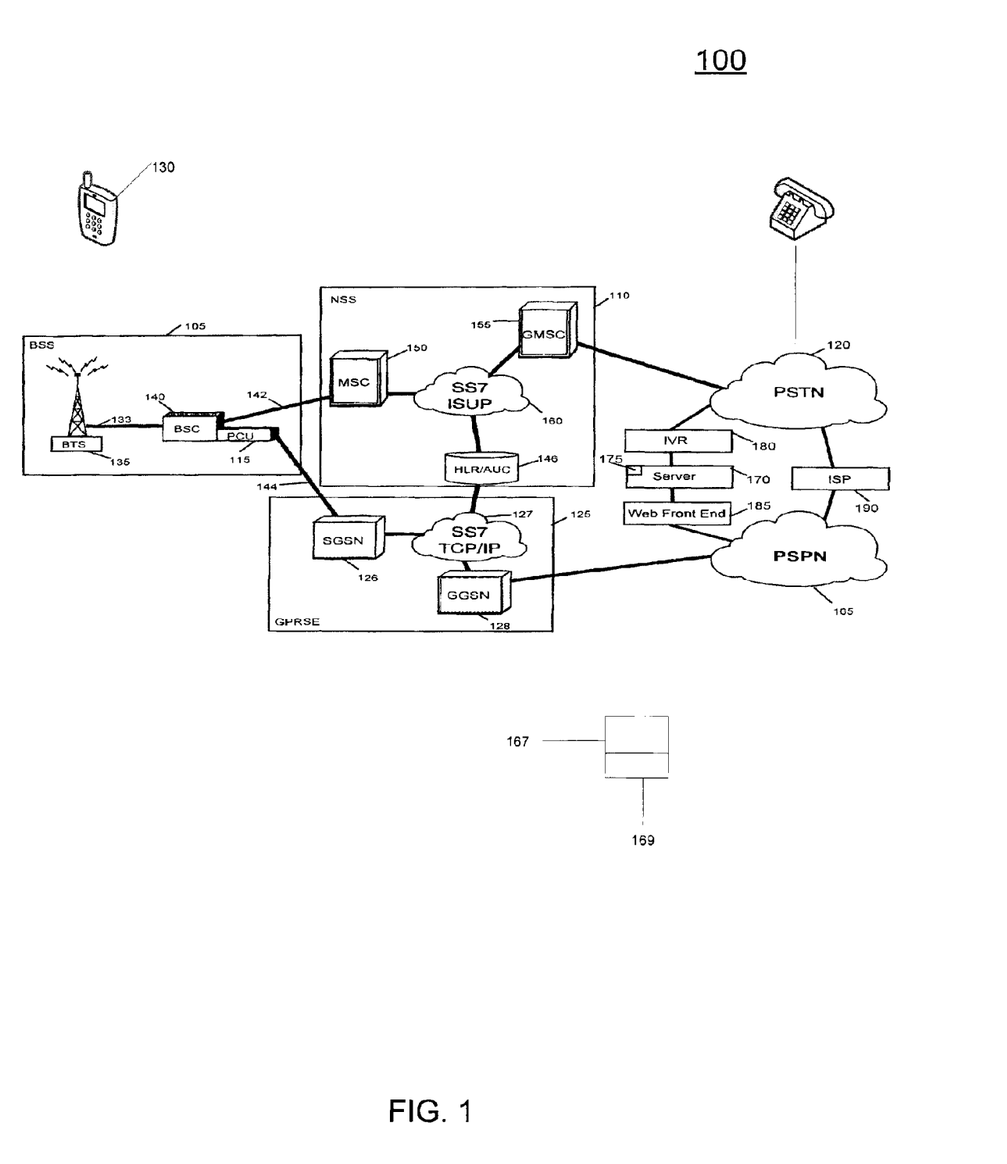
FIG. 1 illustrates a communications network for providing communications to a wireless device consistent with an embodiment of the invention.

As herein embodied and illustrated in FIG. 1, a system 100 for providing mobile station tracking may comprise a base station subsystem (BSS) 105, a network and switching subsystem (NSS) 110, a mobile station (MS) 130, a publicly switched telephone network (PSTN) 120, a publicly switched packet network (PSPN) 165, a user system 167, a tracking server 170, a tracking database 175, an interactive voice response system (IVR) 180, a web front end 185, and an Internet service provider (ISP) 190. Tracking data server 170, tracking database 175, interactive voice response system (IVR) 180, and web front end 185 may be owned, operated, and maintained by an operator of system 100 or by a third party. The elements of system 100 will be described in greater detail below.

Consistent with an exemplary embodiment of the invention, a component for tracking, a component for updating, a component for receiving, and a component for providing may comprise tracking server 170. Other elements of system 100 may, by themselves or in conjunction with other elements, comprise the component for tracking, the component for updating, the component for receiving, or the component for providing.

System 100 may utilize global system for mobile communications (GSM), technology enhanced with general packet radio service (GPRS) in embodiments of the present invention. GSM, developed in the 1980s and predominantly used in Europe, operate in the 900 MHz and 1.8 GHz bands in Europe and the 1.9 GHz PCS band in the U.S. GSM phones may use a subscriber identity module (SIM) smart card that contains user account information. GSM phones are automatically programmed by plugging in the SIM card, allowing GSM phones to be used interchangeably in situations such as renting or borrowing. In addition, GSM may include short messaging service (SMS) that enables text messages up to 160 characters in length to be exchanged. GSM supports data transfer rates of 9.6 Kbps to packet networks.

GPRS is an enhancement for GSM that supports packetized data. GPRS enables a continuous flow of Internet Protocol data packets over the telecommunication system for applications such as Web browsing and file transfer. GPRS differs from SMS because SMS is limited to messages of 160 bytes in length, GPRS has no such limit. EDGE is an enhancement to the GSM and TDMA wireless telecommunication systems that increases data throughput.

Wireless telecommunication technology standards, in addition to GSM and GPRS, may be employed, for example, FDMA, TDMA, CDMA, CDMA2000, UTMS, and EDGE, without departing from the spirit of the invention.

Wireless telecommunication may include radio transmission via the airwaves; however, various other telecommunication techniques can be used to provide wireless transmission including infrared line of sight, cellular, microwave, satellite, blue-tooth packet radio, and spread spectrum radio. Wireless data may include, but is not limited to, paging, text messaging, e-mail, Internet access, instant messaging, and other specialized data applications specifically excluding or including voice transmission.

As shown in FIG. 1, BSS 105 may comprise, for example, a base station controller (BSC) 140, a base transceiver station (BTS) 135, and a packet control unit (PCU) 115. BSS 105 connects to MS 130 through a radio interface and connects to NSS 110 through an interface 142. BSC 140 controls BTS 135 and may control a plurality of other base transceiver stations in addition to BTS 135. BTS 135 may comprise radio transmission and reception equipment located at an antenna site. Associated with BSS 105, a transcoder/rate adaptation unit (TRAU) (not shown) may perform speech encoding and speech decoding and rate adaptation for transmitting data. As a subpart of BTS 135, the TRAU may be located away from BTS 135, for example, at a mobile switching center located in NSS 110. When the TRAU is located in this way, the low transmission rate of speech code channels allows more compressed transmission between BTS 135 and the TRAU.

PCU 115 connects BSS 105 to a general packet radio service (GPRS) 125, which allows, for example, the Internet to link with MS 130. PCU 115 adds level 2 functions of GPRS such as data aware radio link control (RLC) and the MAC protocol layer as well as performing radio resource configuration and channel assignment.

GSM systems may use open system interconnection (OSI). There are several common interfaces defined by OSI such as a common radio interface (referred to as air interface) used between MS 130 and BTS 135, and an A-bis interface 133 used between BTS 135 and BSC 140. With common interfaces such as those defined by OSI, a telecommunication system operator can utilize and interchange equipment of various manufactures when implementing communication systems. The difference between interface and protocol is that an interface represents the point of contact between two adjacent entities (equipment or systems) and a protocol provides information flows through the interface. For example, the GSM radio interface is the transit point for information flow pertaining to several protocols. Interface 142 between NSS 110 and BSS 105 may comprise T-1 lines using X.25 or TCP/IP protocol, for example.

MS 130 may comprise a mobile phone, a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information.

MS 130 may utilize cellular telephone protocols such as wireless application protocol (WAP). Such mobile systems may also be configured to permit the user to purchase products through a browser on a display of the mobile device. The invention, as disclosed in this embodiment, in its broadest sense is not limited to a particular form of mobile system or communication protocol. Other systems and components may be utilized within the scope and spirit of the invention.

Moreover, MS 130 may be a stand-alone piece of equipment for certain services or support the connection of external terminals, such as the interface for a personal computer or facsimile machine. MS 130 may include mobile equipment (ME) (not shown) or a subscriber identity module (SIM). The ME does not need to be personally assigned to one subscriber. GSM phones, for example, may use a SIM card that contains subscriber account information, as GSM phones may be automatically programmed by plugging in the SIM card. This allows GSM phones to be used interchangeably in situations such as renting or borrowing. When a subscriber's SIM is inserted into the ME of MS 130, all calls for the subscriber are delivered to MS 130. Thus, the ME is not associated with a particular number, but rather, is linked to the subscriber's SIM.

In addition, GSM systems may include short messaging service (SMS) that enables text messages up to 160 characters in length to be exchanged. SMS is a text message service that enables short messages of generally no more than 140-160 characters in length to be sent and transmitted from mobile stations. SMS was first introduced in the GSM system and later supported by other digital-based mobile communication systems. Unlike paging, short messages are stored and forwarded in SMS centers. SMS messages travel to mobile stations over the wireless telecommunication system's control channels, which are separate and apart from voice channels.

Still referring to FIG. 1, NSS 110 may comprise a mobile switching center (MSC) 150, a first network 160, a home location register/authentication center (HLR/AUC) 146, and a gateway mobile switching center (GMSC) 155. NSS 110 manages the communication between subscribers, for example, an operator using MS 130, and other telecommunication users, for example, those using publicly switched telephone network (PSTN) 120. PSTN 120 may comprise, for example, the worldwide voice telephone network.

MSC 150 coordinates call set-up to and from subscribers using MS 130. MSC 150 may control several base station controllers such as, and similar to BSC 140. GMSC 155 is used to interface with external networks for communication with users outside of the wireless system, such users on PSTN 120.

HLR/AUC 146 may comprise a stand-alone computer without switching capabilities, a database which contains subscriber information, for example, information relating to a current level of service for the subscriber (normal, suspension, disconnected), and information related to the subscriber's current location, but not the actual location of the subscriber. The AUC portion of HLR/AUC 146 manages the security data for subscriber authentication. Another sub-division of HLR/AUC 146 may include an equipment identity register (EIR) (not shown), which may store data relating to mobile equipment (ME).

NSS 110 may also include a visitor location register (VLR) (not shown). The VLR links to one or more mobile switching center located on other systems, temporarily storing subscription data of subscribers currently served by MSC 150. The VLR holds more detailed data than HLR/AUC 146. For example, the VLR may hold more current subscriber location information than the location information at HLR/AUC 230.

GMSC 155 is utilized to interface with PSTN 120. In order to set up a requested call, the call is initially routed to GMSC 155, which finds the correct home location register by knowing the director number of the subscriber. GMSC 155 has an interface with an external network, such as PSTN 120, for gatewaying communications.

The elements of NSS 110 are connected using first network 160. First network 160 may comprise an intelligent network utilizing signal system 7 (SS7) in an ISDN user part (ISUP) protocol. SS7 is a global standard for telecommunications defined by the Telecommunication Standardization Sector of the International Telecommunication Union. The SS7 standard defines the procedures and protocol by which network elements in a public switched telephone network exchange information over a digital signaling network to effect wireless and wireline call setup, routing, and control. ISUP defines the protocol and procedures used to set-up, manage, and release trunk circuits that carry voice and data calls over a public switched telephone network. ISUP is used for both ISDN and non-ISDN calls Calls that originate and terminate at the same switch do not use ISUP signaling.

As shown in FIG. 1, GPRSE 125 may comprise a serving GPRS service node (SGSN) 126, a second network 127, and a gateway GPRS service node (GGSN) 128. In order to implement GPRS, two new node types may be added to a conventional GSM network, GGSN 128 and SGSN 126. Also, the interfaces to the conventional GSM system may be augmented and an extra unit, such as PCU 115 that may be located in BSS 105 as described above, may be added.

SGSN 126 connects GPRSE 125 to BSS 105 through interface 144, which may comprise T-1 lines using X.25 or TCP/IP protocol, for example. SGSN 126 receives the traffic from mobile subscribers associated with BSS 105 and forwards the traffic to GGSN 128. SGSN 126 uses its links with HLR/AUC 146 to authenticate and bill subscribers, and may provide additional services such as data compression, session management and encryption.

GGSN 128 acts as a gateway to PSPN 165, which is most often a publicly switched packet network such as the Internet. Data is sent across the GPRS network to GGSN 128, un-encapsulated, and then forwarded to the next node. To the outside world GGSN 128 may appear as just another router on the Internet. Common features of GGSN 128 may include firewall/packet-filtering technologies and a dynamic host configuration protocol (DHCP) server to configure IP options of MS 130 as it logs onto the network. DHCP automatically assigns IP addresses to client stations logging onto a TCP/IP network. DHCP eliminates having to manually assign permanent IP addresses. DHCP software typically runs in servers and is also found in network devices such as ISDN routers and modem routers that allow multiple users access to the Internet.

SGSN 126 and GGSN 128 are connected through second network 127. Second network 127 may employ SS7 as described above and use transmission control protocol/Internet protocol (TCP/IP).

User device 167 may comprise a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information as know by those of ordinary skill in the art. User device 167 may comprise a communication unit 169 capable of providing voice or data communications between communication unit 169 and MS 130. For example, communication unit 169 may include a radio, a cellular telephone, a wire line telephone, a hand-held computing device, microprocessor-based or programmable consumer electronic device, a personal digital assistant (PDA), a facsimile machine, a pager, or a portable computer. Other types of devices may comprise communication unit 169.

In addition, communication unit 169 may comprise a wireless unit and communicate with MS 130 using any wireless technology including, for example, cellular or direct connect radio. Moreover, there are many other ways in which MS 130 and communication unit 169 may ultimately communicate and exchange voice, data, and other information. In addition, communication unit 169 and user device 167 may be one device, or separate devices.

Tracking server 170 may comprise a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information. Tracking database 175 may be located on storage media in tracking server 170 or other storage media in systems, servers, or components accessible by tracking server 170. Tracking database 175 may at least comprise geographic data that may include geographic coordinates of MS 130 at a given time. The geographic data may include elements other than coordinates of MS 130 at a given time.

Connecting tracking server 170 to PSTN 120 is IVR 180. An IVR is an automated telephone answering system that responds with a voice menu and allows the user to make choices and enter information via the keypad. IVR systems are widely used in call centers as well as a replacement for human operators and may also integrate database access and fax response. Using a dual-tone multifrequency (DTMF) signal such as those generated by a telephone keypad, data may be entered into IVR 180 from a telephone, for example, communication unit 169, by a DTMF signal passing from communication unit 169 through BSS 105, NSS 110, PSTN 120, and to IVR 180. From IVR 180, the data may then be pushed onto a LAN, for example, to tracking server 170 and stored in tracking database 175 on tracking server 170. As an enhancement to IVR 180, a voice portal (not shown) may be employed. With a voice portal, rather than pressing keys of the DTMF keypad, a user, for example, second subject 168, may speak a word or phrase into a microphone on communication unit 169 in order to make a menu selection.

Connecting tracking server 170 to PSPN 165 is web front end 185. One function of web front end 185 is to provide an Internet interface for tracking server 170. A "web front end" is a computer system that receives hypertext transfer protocol (http) requests from a web browser computer program directed to a specific URL, and provides responses to the requesting computer system that, when processed by the web browser computer program, displays a page of the Internet web site associated with the URL. For example, an exemplary URL employed for the present invention may comprise "http://www.trackingdata.com". Directing an Internet-connected computer system with an operative Internet web browser program at this URL causes display of the home page associated with this web site on the computer's display.

Rather than using GPRSE 125, MS 130 or communication unit 169 may connect to tracking server 170 through NSS 110, PSTN 120, Internet service provider (ISP) 190, and then to PSPN 165 and web front end 185. An Internet service provider is an organization that provides access to the Internet, for example, from a publicly switched telephone network. Small Internet service providers provide service via modem and ISDN while the larger ones also offer private line hookups such as T1 lines or fractional T1 lines.

Figure 2:
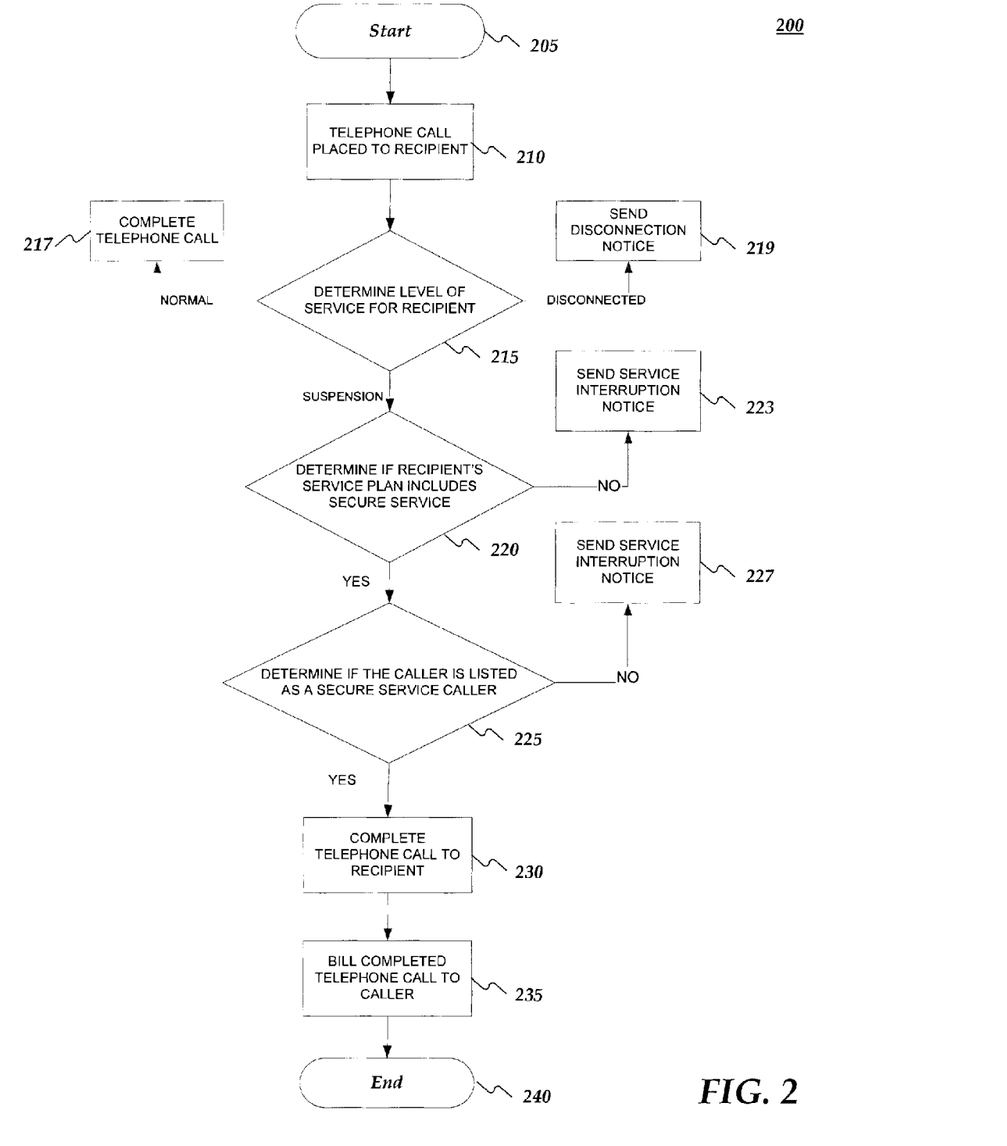
FIG. 2 is a flow chart of a method for securing wireless communications service when a plan associated with the wireless communications service is under suspension consistent with an embodiment of the invention.

FIG. 2 is a flow chart setting forth the general stages involved in a method 200 performed the mobile station tracking system (system) 100 consistent with an embodiment of the invention for securing wireless communications service, for example, cellular telephone service, via a secure service feature. Ways to implement the stages of method 200 will be described in greater detail below. Method 200 begins at starting block 205 and proceeds to stage 210 where the HLR/AUC 146 system 100 receives a telephone call from a caller to a called party.

Next at stage 215 the MSC 150 determines a level of service associated with the called party. For example, the cellular telephone service for the called party may exist in a normal, suspension or disconnected state. The normal state may exist when the billing for the called party's service plan is up to date, or reasonably delayed. The suspension state may exist when the cellular telephone service for the called party is beyond a reasonable delay period for receiving payment for cellular service. The disconnected state may exist when an associated cellular telephone service provider has permanently terminated cellular telephone service.

If during the determination of stage 215, the MSC 150 within system 100 determines that the level of service for the called party exists in a normal state, the method 200 proceeds to stage 217 where the MSC 150 acts by controlling various BSCs 140 in order to complete the telephone call between a caller and a called party, and communications between the two parties ensues. If during the determination of stage 215, the MSC 150 determines that the level of service for the called party exists in a disconnected state, the method 200 proceeds to stage 219 where the MSC 150 does not complete the telephone call between a caller and a called party, and the MSC 150 within system 100 notifies the caller that cellular telephone service has been disconnected. In addition, when the cellular telephone service exists in a disconnection state, the associated cellular telephone service provider may reassign a cellular telephone number associated with the disconnected cellular telephone service to another customer. Accordingly, at stage 219, the caller may be inadvertently connected to the new customer.

If during the determination of stage 215, the MSC 150 determines that the level of service for the called party exists in a suspension state, the method 200 proceeds to stage 220 where the HLR/AUC 146 determines if a service plan associated with the called party includes a secure service feature. If the service plan of the called party does not includes the secure service feature, at stage 223, the MSG 150 may send the caller notification of service interruption for the called party. If the called party has a subscription for the secure service feature by, for example, paying a monthly or annual service fee for the secure service feature, the method 200 proceeds to stage 225.

At stage 225, the HLR/AUC 146 may determine if the caller is listed on a secure service calling list. The secure service feature may allow the called party to enter caller information, for example, telephone numbers, of one or more callers for storage in the secure service calling list. The secure service feature may facilitate communications between the listed callers and the called party. The list may be stored in the HLR/AUC 146 within system 100, or in any other suitable storage location within the system 100. If the caller is not listed on the secured service calling list, at stage 227, the MSC 150 sends the caller notification of service interruption for the called party. If the caller is listed on the secured service calling list, at stage 230, the MSC 150 establishes communications between the caller and the called party. Next, at stage 235, the HLR/AUC 146 provides billing information for the communications between the caller and the called party. A wireless communications service provider may use the billing information for administrative, technical or other purposes. Furthermore, the wireless communications service provider may charge the caller for calling the called party, or may include telephone calls placed using the secure service feature as part of a service package. At stage 240, method 200 ends.

Consistent with embodiments of the present invention, cellular telephone service may be secured when a level of wireless communications service is in a suspension state. Accordingly, a caller listed on a secure service caller list may communicate with a called party even though the called party may not be able to utilize a wireless communications network in a normal manner, i.e., send and receive communications. A charge may be associated with entering a certain amount of callers into the secure service caller list, for example, ten callers, and have additional charges for entries above ten callers. A caller listed on the secure service caller list may communicate with the called party, but the caller will be charged for placing the call because the called party's service is under suspension. Changes can vary for the caller depending on which service provider the caller is using. For example, a caller using Cingular as a wireless service provider may be charged $2.00 for placing a telephone call to the called party because the called party also uses Cingular, and the caller may be charged $3.00 for placing the telephone call if caller uses Verizon as a wireless service provider.

In addition, one or more callers listed on the secure service caller list may receive notification of the called party's outstanding bill. For example, a parent calling a child whose cellular telephone service is under suspension may receive a message notifying the parent that cellular telephone service for the child is under suspension, a bill amount, and a notification that they will be charged for placing the current telephone call prior to being connected to the child.

Generally, consistent with embodiments of the invention, program modules may be used. Program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method, for enabling communication between a caller device and a called party device when a called-party service plan for the called party is under suspension, comprising:
   determining, by a mobile switching center, in response to receiving an intended call from the caller device and for the called party device, a current state of a wireless communications service for a telephone number associated with the called party device;
   determining, by a home location register, if the current state of the wireless communications service for the telephone number associated with the called party device is a suspension state, whether the called-party service plan for the called party device includes a secure service feature allowing the mobile switching center to establish a communication between the called party device and the caller device, wherein the called-party service plan is charged a fee for the secure service feature and a caller-party service plan for the caller device is charged a fee for the caller device to be listed on a secure service caller list for the called-party service plan and no call intended for the called party device is established except for intended calls from callers whose telephone numbers are listed on the secure service caller list;
   if the home location register determines that the service plan associated with the telephone number for the called party device does not include the secure service feature:
      instructing, by the home location register, the mobile switching center to send to the caller device a notification of service interruption for the telephone number associated with the called party device; and
      sending, by the mobile switching center, to the caller device the notification of service interruption for the telephone number associated with the called party device; and
   if the home location register determines that the service plan associated with the telephone number for the called party device includes the secure service feature and the current state of wireless communication service is in the suspension state:
      determining, by the home location register, whether a telephone number associated with the caller device is listed on the secure service caller list;
      instructing, by the home location register, if the home location register determines that the telephone number associated with the caller device is not listed on the secure service caller list, the mobile switching center to send the caller device notification of service interruption for the telephone number associated with the called party device;
      instructing, by the mobile switching center, if the home location register determines that the telephone number associated with the caller device is listed on the secure service caller list, the mobile switching center to provide a communications path to facilitate connection of a connected call with the called party device; and
      providing, by the mobile switching center, the communications path to facilitate connection of the connected call with the called party device;
   wherein a cost associated with the communication between the caller device and the called party device is charged to the caller party and the cost depends on an identity of a service provider serving the caller device.

2. The method of claim 1, further comprising providing, by the mobile switching center, if the mobile switching center determines that the current state of the wireless communications service for the telephone number associated with the called party device is the suspension state, a notification to the caller device of an outstanding bill for the telephone number associated with the called party device.

3. The method of claim 1, further comprising billing the service plan for the secure service feature.

4. The method of claim 1, wherein the suspension state is a temporary disconnection of the wireless communications service for the telephone number associated with the called party device.

5. The method of claim 1, wherein the secure service feature operates for a predetermined time after the wireless communications service for the telephone number associated with the called party device is the suspension state.

6. The method of claim 1, wherein the suspension state exists when the wireless communications service for the called party device is beyond a predetermined reasonable delay period for receiving payment for the wireless communications service.

7. The method of claim 1, further comprising billing, by a billing system, the connected call to an entity not associated with the telephone number for the called party device.

8. The method of claim 1, wherein an additional charge is applied to the called-party service plan for the called party device if a number of entries on the secure service caller list exceeds a predefined number.

9. A system, for enabling a wireless communications service for a called party device when a called-party service plan associated with the wireless communications service for the called party device is under suspension, comprising:
   a mobile switching center configured to having first computer-executable instructions that, when executed by a first processor, cause the first processor to perform first operations comprising:
      determining, in response to receiving an intended call from a caller device and for a called party device, a current state of wireless communications service for the telephone number associated with the called party device;
      sending, per instructions received from a home location register, to the caller device a notification of service interruption for the telephone number associated with the called party device; and
      providing, per instructions received from the home location register, a communications path to facilitate connection of a connected call to the called party device; and
   the home location register having second computer-executable instructions that, when executed by a second processor, cause the second processor to perform second operations comprising:
      determining whether a called-party service plan for the called party device includes a secure service feature allowing the mobile switching center to establish a communication between the called party device and the caller device, wherein the called-party service plan is charged a fee for the secure service feature and a caller-party service plan for the caller device is charged a fee for a telephone number associated with the caller device to be listed on a secure service caller list for the called party device, when the current state of wireless communications service for the telephone number associated with the called party device is a suspension state, wherein no call intended for the called party device is established except for intended calls from callers whose telephone numbers are listed on the secure service caller list;

instructing the mobile switching center to send to the caller device a notification of service interruption for the telephone number associated with the called party device, if the home location register determines that the service plan associated with the telephone number for the called party device does not include the secure service feature; and determining whether the telephone number associated with the caller device is listed on the secure service caller list, if the home location register determines that the service plan associated with the telephone number for the called party device includes the secure service feature and the current state of wireless communication service for the telephone number associated with the called party device is in the suspension state;

instructing, if the home location register determines that the telephone number associated with the caller device is not listed on the secure service caller list, the mobile switching center to send to the caller device a notification of service interruption for the telephone number associated with the called party device; and instructing if the home location register determines that the telephone number associated with the caller device is listed on the secure service caller list, the mobile switching center to provide a communications path for connecting the caller device with the called party device; and wherein a cost associated with the communication between the caller device and the called party device is charged to the caller party and the cost depends on an identity of a service provider serving the caller device.

10. The system of claim 9, wherein the first operations further comprise providing, if it is determined that the current state of the wireless communications service for the telephone number associate with the called party device is the suspension state, a notification to the caller device of an outstanding bill for the telephone number associated with the called party device.

11. The system of claim 9, wherein the suspension state is a temporary disconnection of the wireless communications service for the telephone number associated with the called party device.

12. The system of claim 9, wherein the suspension state exists when the wireless communications service for the telephone number associated with the called party device is beyond a predetermined reasonable delay period for receiving payment for the wireless communications service.

13. The system of claim 9, further comprising a billing subsystem configured to bill the called-party service plan for the secure service feature.

14. The system of claim 9, further comprising a billing subsystem configured to bill the connected call to an entity not associated with the telephone number for the called party device.

15. The system of claim 9, wherein the secure service feature operates for a predetermined time after the wireless communications service is the suspension state.

16. The system of claim 9, wherein an additional charge is applied to the called-party service plan for the called party device if a number of entries on the secure service caller list exceeds a predefined number.

17. A non-transitory computer-readable medium having stored thereon a set of instructions that, when executed by a processor, cause the processor to perform operations, for enabling a wireless communications service between a caller device and a called party device when a called-party service plan for the called party device is under suspension, comprising:

determining, in response to receiving an intended call from a caller device to a called party device, a current state of the wireless communications service for the telephone number associated with the called party device;

determining whether the called-party service plan includes a secure service feature allowing the mobile switching center to establish a communication between the called party device and the caller device, wherein the called-party service plan is charged a fee for the secure service feature and a caller-party service plan for the caller device is charge a fee for a telephone number associated with the caller device to be listed on a secure service caller list for the called party device, when the current state of the wireless communications service is a suspension state, and no call to the called party device is established except for intended calls from callers whose telephone numbers are listed on the secure service caller list;

sending the caller device a notification of service interruption for a telephone number associated with the called party device, if the service plan associated with the telephone number for the called party device does not include the secure service feature;

determining whether a telephone number associated with the caller device is listed on the secure service caller list, if the called-party service plan includes the secure service feature and the current state of wireless communications service associated with the telephone number of the called party device is in the suspension state;

sending to the caller device a notification of service interruption of telecommunications service for the telephone number associated with the called party device, if the telephone number associated with the caller device is not listed on the secure service caller list;

providing a communications path to facilitate connection of a connected call with the called party device; and charging, to the caller party, if the telephone number associated with the caller device is listed on the secure service caller list, a cost associated with the communication between the caller device and the called party device, wherein the cost depends on an identity of a service provider serving the caller device.

18. The non-transitory computer-readable medium of claim 17, wherein the operations further comprise providing, if the current state of the wireless communication service for the called party device is the suspension state, a notification to the caller device of an outstanding bill associated with the telephone number for the called party device.

19. The non-transitory computer-readable medium of claim 17, wherein the operations further comprise billing the called-party service plan for the secure service feature.

20. The non-transitory computer-readable medium of claim 17, wherein the suspension state is a temporary disconnection of the wireless communications service for the telephone number associated with the called party device.

21. The non-transitory computer-readable medium of claim 17, wherein the suspension state exists when the wireless communications service for the telephone number associated with the called party device is beyond a predetermined reasonable delay period for receiving payment for the wireless communications service.

22. The non-transitory computer-readable medium of claim 17, wherein the secure service feature operates for a predetermined time after the wireless communications service is the suspension state.

23. The non-transitory computer-readable medium of claim 17, wherein an additional charge is applied to the called-party service plan for the called party device if a number of entries on the secure service caller list exceeds a predefined number.

* * * * *